Aug. 13, 1929. F. O'NEILL 1,724,770
NOVELTY
Filed June 29, 1927 2 Sheets-Sheet 1
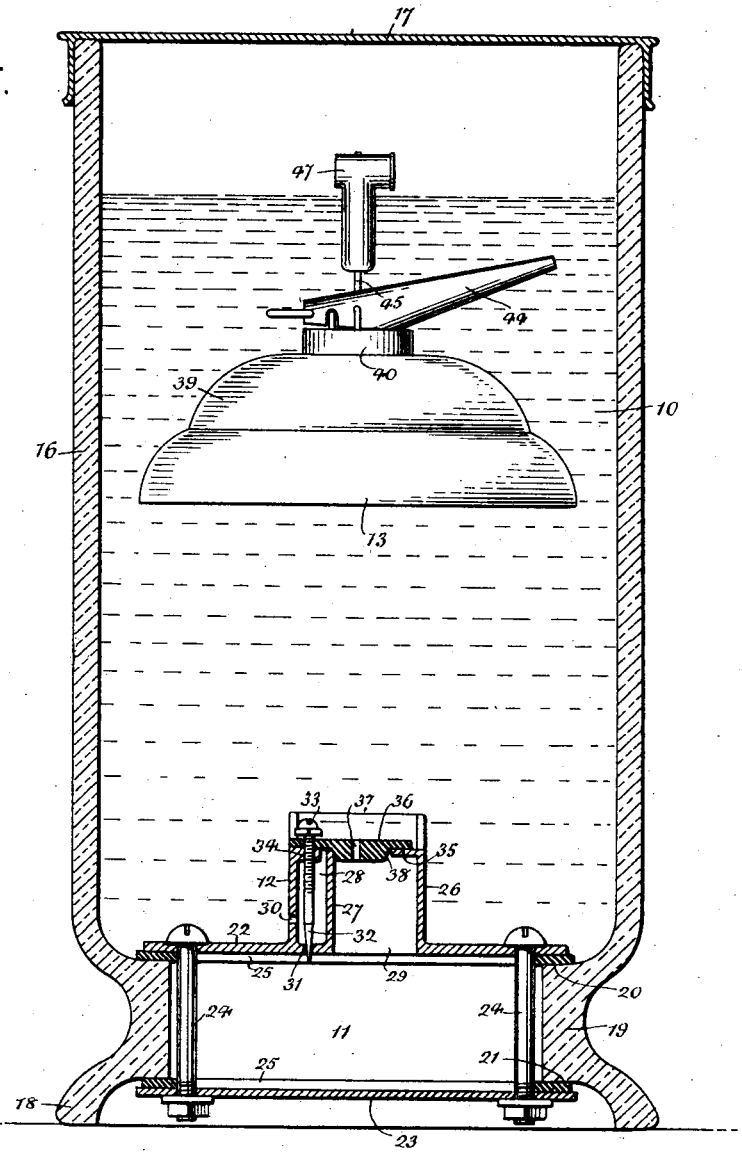
Fig. I.
WITNESSES
H. T. Walker
Chris Feinle
INVENTOR
Felix O'Neill
BY
ATTORNEYS Aug. 13, 1929.    F. O'NEILL    1,724,770
NOVELTY
Filed June 29, 1927    2 Sheets-Sheet 2
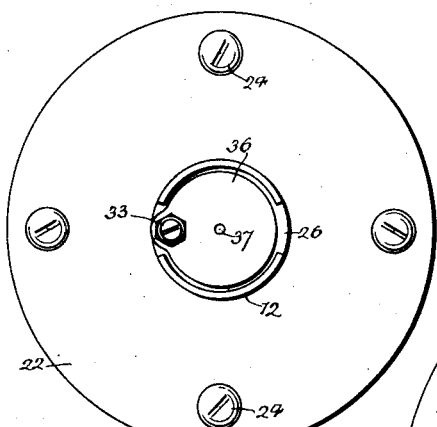
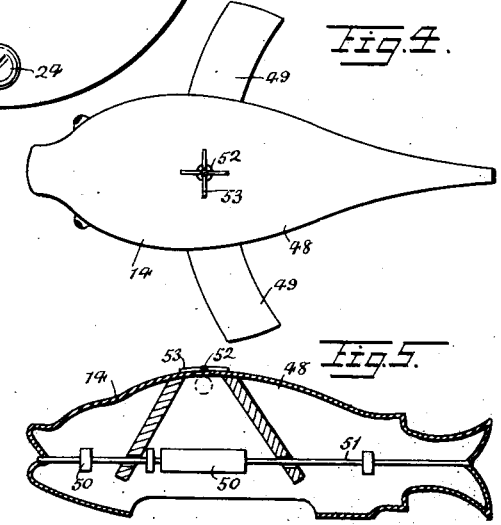
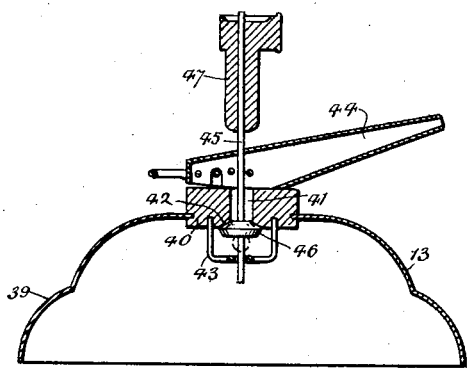
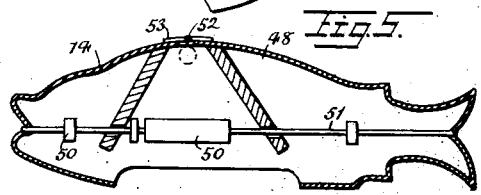
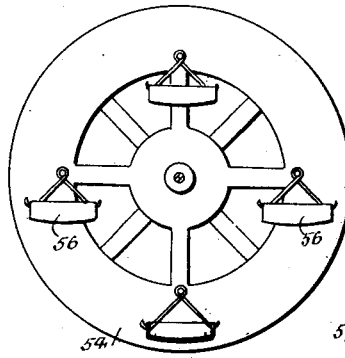
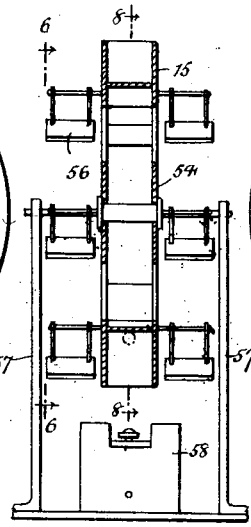
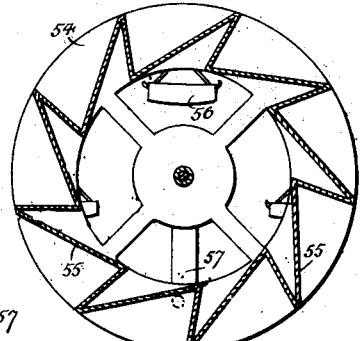
WITNESSES
H. T. Walker
Chris Feinle
INVENTOR
Felix O'Neill
BY
ATTORNEYS Patented Aug. 13, 1929.

1,724,770

UNITED STATES PATENT OFFICE.

FELIX O'NEILL, OF SALEM, OREGON.

NOVELTY.

Application filed June 29, 1927. Serial No. 202,342.

This invention relates to a novelty.

The principal object of the present invention is to provide a novelty characterized by a combination of features which will be amusing to children; a novelty which may be placed in a show window to attract attention to advertise goods, wares, and merchandise on display; and a novelty which may be used in the room of a sick person as a substitute for books and other things to pass away the time.

The nature of the invention and its distinguishing features and advantages will appear when the following specification is read in connection with the accompanying drawing, in which—

Figure 1 is a sectional view of a novelty illustrating one embodiment of the present invention.

Fig. 2 is a plan view of the means for producing the bubbles.

Fig. 3 is a sectional view through one of the submergible devices used.

Fig. 4 is a plan view of another type of submergible device used.

Fig. 5 is a longitudinal sectional view through the device shown in Fig. 4.

Fig. 6 is a sectional view taken on the line 6—6 of Fig. 7, through another type of device used.

Fig. 7 is a sectional view taken on the line 7—7 of Fig. 8.

Fig. 8 is a sectional view taken on the line 8—8 of Fig. 7.

Generally stated, the novelty of the present invention comprises the combination of a water chamber 10 in which a predetermined quantity of water is placed, an air chamber 11 in communication with the water chamber 10, means 12 for controlling and regulating the flow of water into the air chamber 11, the water entering the air chamber forcing a quantity of air out of the air chamber into the water chamber to produce bubbles at predetermined intervals, and divers devices 13, 14 and 15 acted upon by the bubbles to cause them to simulate movements or actions characteristic of the devices.

The water chamber 10 and air chamber 11 may be diversely formed, and in the present instance are formed by the provision of a vessel 16 of glass open at each end, the upper end of which has a removable cover 17, and the lower end having a base 18 and an inwardly directed annular section 19 providing shoulders 20 and 21. Circular plates 22 and 23 are provided. The plates 22 and 23 are held in place on the section 19 by the use of suitable fastening elements such as the bolts 24 which extend through holes respectively in the plates 22 and 23. Suitable rubber gaskets 25 are arranged respectively between the plates 22 and 23 and the shoulders 20 and 21 on the section 19 to provide water and air tight joints. In this way the water chamber 10 and air chamber 11 hereinbefore referred to will be formed.

In order to produce bubbles at predetermined intervals by allowing water to flow from the water chamber 10 into the air chamber 11, so as to force a quantity of air out of the air chamber 11 into the water chamber 10 there is provided means presently to be described. On the plate 22 there is formed or connected a small casing 26 having a partition 27 which divides the casing 26 into a small chamber 28 and a comparatively larger chamber 29. The chamber 28 communicates with the water chamber 10 by a water inlet 30 and communicates with the air chamber 11 by a water outlet 31. The outlet 31 is controlled by a needle valve member 32 on one end of a screw 33 which is adjustably supported by a lug 34 on the casing 26. The chamber 29 is in communication with the air chamber 11. The casing 26 has a seat 35. Arranged on the seat 35 is a valve member 36 of rubber. The valve member 36 has an air outlet 37. The valve member 36 has a projection 38. The valve member 36 is held in place by the screw 33. The arrangement of the valve member 36 is such that the projection 38 will extend into the chamber 29 below the seat 35. When the vessel 16 is resting on its base 18 water will not leak under the valve member 36 because the pressure of the water on the comparatively larger area of the upper surface of the valve member will be greater than the air pressure on the comparatively smaller area of the lower surface of the projection 38. Water is allowed to flow from the water chamber 10 into the air chamber 11 through the water inlet 30 and water outlet 31. The water will enter the water inlet 30 and not the air outlet 37 because the water inlet 30 is at a lower level than the outlet 37. The water pressure at the level of the inlet 30 being greater than the pressure at the level of the outlet 37. The water entering the air chamber 11 will compress the air to an extent so as to force a small quantity of air through the outlet 37 into the water in the chamber 10. The small quantity of air forced out of the outlet 37 will produce a bubble the size of the outlet 37. In accordance with the invention bubbles are produced at predetermined intervals depending upon the adjustment of the screw 33 whose needle valve member 32 controls the flow of water through the outlet 31 to vary the interval of bubble formation. The valve member 32 may be disposed so that a bubble will be formed at minute intervals or fractions thereof.

The device 13 is in the form of or simulates a submarine body, and will be of a predetermined weight and size capable of sinking under its own weight. The device includes a bell-shaped body 39. The body 39 has a member 40 arranged on its crown. The member 40 has a hole 41, the lower end of which is surrounded by a seat 42. A guide 43 consisting of crossed wires is arranged on the under side of the member 40. A tubular member 44 simulating a gun is arranged on the top of the member 40 for slight pivotal movement. A stem 45 is provided. The stem 45 has a valve member 46 which moves into and out of engagement with the seat 42 to open and close the lower end of the hole 41. The upper end of the stem 45 has a member 47 which simulates a periscope and is adapted to float. As stated, the device 13 is of a predetermined weight and size which will sink under its own weight in the water arranged in the chamber 10. When the device 13 is submerged, the member 47 will hold the valve member 46 in engagement with the seat 42 because of its tendency to float upwardly. Any air trapped in the body 39 will pass out of the hole 41 through the tubular member 44 before the valve member 46 is in engagement with the seat 42. When the device 13 sinks to a position over the casing 26 it will remain there until a bubble is formed. The bubble will rise to the guide 43 and adhere thereto, thereby rendering the device 13 buoyant and causing it to rise to the surface of the water. As the device 13 rises to the surface, the member 47 will be first to move above the surface and under its own weight will move downwardly at a certain time to move the valve member 46 off the seat 42. This will allow the bubble to pass out through the hole 41, into and through the tubular member or gun 44. The bubble passing from the gun 44 will simulate the firing of a shot. The air in the bubble will ultimately be liberated to the space in the vessel 16 above the surface of the water. The device 13 will again sink to a position at the bottom of the vessel 16 over the casing 26, and the action will be repeated until all of the air is exhausted from the chamber 11 by water. The vessel 16 may be inverted which will allow the water in the chamber 11 to pass into the chamber 10 past the valve member 36 which will open automatically. The chamber 11 will again be filled with air and by again inverting the vessel 10 and resting it on a level surface on its base 18 bubbles will be produced.

Other types of submergible devices than the one 13 may be used. For instance the device 14 is an imitation of a fish and consists of a hollow body 48 having fins 49, and suitable ballast 50. The ballast 50 is adjustable on a rod 51 supported by the body 48. The ballast 50 constitutes a means for properly balancing the device 14 while in the water. The hollow body 48 has a hole 52 over which is arranged a screen 53. The device 14 is of a predetermined weight and size which allows it to sink under its own weight when placed in the water. The fins 49 keep the device 14 centered and guided in its downward movement over the bubble producing means at the bottom of the vessel 16. The bubble rises and adheres to the screen 53 rendering the device 14 buoyant. This causes the device 14 to rise. When the device 14 reaches the surface of the water, the bubble will be liberated and will burst. Immediately this happens the device 14 will sink under its own weight to a position over the bubble producing means, causing a repetition of the action.

In Figs. 6, 7 and 8 are shown the device 15 hereinbefore referred to which is in the form of a miniature ferris-wheel consisting of a rotor 54 having tangentially arranged portions 55, and pivotally mounted attachments 56. The rotor 54 is operatively mounted on members 57 which connect the ferris-wheel with bubble producing means 58. The ferris-wheel and connected means 58 constitute a unit adapted to be associated with the vessel 16. The ferris-wheel 15 will be operated by a bubble adhering to one of the portions 55, which will cause the rotor 54 to turn until the bubble releases itself. The movement of the rotor 54 will occur at intervals according to the production of bubbles by the means 58.

It is to be understood that any other form of submergible device than those shown may be used, and that minor details of construction may be modified and rearranged without departing from the spirit of the invention, the scope of which is set forth in the appended claims.

I claim:

1. In a novelty of the class described, a transparent vessel having a quantity of water therein, an air chamber embodied by the vessel in communication with the interior of the vessel by a water passage and an air outlet above the water passage, means operable in conjunction with said water passage to control the flow of water through the water passage from the vessel to said air chamber, the water entering said air chamber forcing a quantity of air out of said air chamber through said air outlet to produce a bubble in the water in said vessel.

2. A novelty comprising the combination of a transparent vessel having a space for a quantity of water, an air chamber having an air outlet communicating with the water space of the vessel, a passage leading from the water space of the vessel to the air chamber whereby water may flow from the water space to the air chamber, to force air out through the air outlet to continually produce a bubble, a device adapted to be arranged in the water space of the vessel and submergible under its own weight in the water, said device having means to which the bubble adheres when the device is submerged to cause the device to rise to the surface of the water, and said device having means which operates automatically when the device reaches the surface of the water to release the bubble to allow the device to submerge.

3. A novelty comprising the combination of a transparent vessel having a space for a quantity of water, an air chamber in one end of the vessel, said air chamber being smaller in capacity than the water space, a passage leading from the water space of the vessel to the air chamber whereby water may flow from the water space to the air chamber, said air chamber having an outlet of a size to allow air to be forced therethrough by the water entering the air chamber through said passage from the water space to continually produce a bubble, but to prevent water from entering the air chamber from the water space, a device adapted to be arranged in the water space of the vessel and submergible under its own weight in the water, said device having means to which the bubble adheres when the device is submerged, to cause the device to rise to the surface of the water, said device having means which operates automatically when the device reaches the surface of the water, to release the bubble to allow the device to submerge, and means adapted to operate by inverting the vessel to allow water which has entered the air chamber to flow therefrom into the water space, and at the same time causing the air which has entered the water space to be displaced by the water to force the air into the air chamber.

4. In a novelty of the class described, the combination of a transparent vessel having a space partly filled with water, an air chamber, a valve member held in closed position by the water in the water space, said air chamber having an air outlet communicating with the air chamber, a passage leading from the water space to the air chamber whereby water may flow from the water space to the air chamber to force air out through said outlet to continually produce a bubble, said valve member being movable to an opened position by inverting the vessel to allow water which has entered the air chamber to flow therefrom into the water space, and at the same time causing the air which has entered the water space to be displaced by the water, to force the air into the air chamber.

FELIX O'NEILL.